(12) United States Patent
Stieglitz et al.

(10) Patent No.: US 9,229,928 B2
(45) Date of Patent: Jan. 5, 2016

(54) LANGUAGE LEARNING PLATFORM USING RELEVANT AND CONTEXTUAL CONTENT

(71) Applicant: NULU, INC., San Diego, CA (US)

(72) Inventors: Avi Vince Stieglitz, Beverly Hills, CA (US); Eitan Geft, San Diego, CA (US); David Allison, San Diego, CA (US)

(73) Assignee: NULU, Inc., San Diego, CA (US)

( * ) Notice: Subject to any disclaimer, the term of this patent is extended or adjusted under 35 U.S.C. 154(b) by 301 days.

(21) Appl. No.: 13/801,180

(22) Filed: Mar. 13, 2013

(65) Prior Publication Data

US 2014/0100844 A1    Apr. 10, 2014

Related U.S. Application Data

(60) Provisional application No. 61/610,374, filed on Mar. 13, 2012.

(51) Int. Cl.
*G09B 19/06* (2006.01)
*G06F 17/28* (2006.01)
*G09G 5/30* (2006.01)

(52) U.S. Cl.
CPC .......... *G06F 17/289* (2013.01); *G06F 17/2827* (2013.01); *G09B 19/06* (2013.01); *G09G 5/30* (2013.01)

(58) Field of Classification Search
CPC ....... G06F 17/289; G06F 3/044; G06F 3/045; G06F 3/0481; G06F 3/04886
USPC .......... 704/3, 7; 715/763, 781, 790, 793, 863; 358/1.15; 345/173, 179
See application file for complete search history.

(56) References Cited

U.S. PATENT DOCUMENTS

| | | | |
|---|---|---|---|
| 7,310,779 B2 * | 12/2007 | Carro | 715/763 |
| 8,477,331 B2 * | 7/2013 | Wei et al. | 358/1.15 |
| 2013/0103383 A1 * | 4/2013 | Du et al. | 704/3 |

* cited by examiner

*Primary Examiner* — Charlotte M Baker
(74) *Attorney, Agent, or Firm* — Cooley LLP

(57) ABSTRACT

A method and system for displaying translated text for language learning having content in a first language and a translation thereof in a second language. A user can hover over the content with a mouse to display a popup box containing a content component in the second language corresponding to a content component in the first language. The content components are highlighted as the user hovers over them with the mouse to identify corresponding content components between the first language and the second language. Also provided is an electronic flashcard generated by the user from the content.

11 Claims, 16 Drawing Sheets

LANGUAGE LEARNING PLATFORM USING RELEVANT AND CONTEXTUAL CONTENT

The present application claims the benefit of U.S. Provisional Patent Application No. 61/610,374 filed on Mar. 13, 2012 which is incorporated herein by reference in its entirety for all purposes.

FIELD

The systems and methods of the disclosure relate to providing an educational environment for learning foreign languages. In particular, but not by way of limitation, the disclosure relates to systems and methods that enable user interaction with content in two or more languages.

BACKGROUND

Tools and aids for learning a foreign language are numerous and well known in he art. Translation systems for websites are also known in the art, such as U.S. Pat. No. 5,765,131 directed to "Language Translation System and Method" to Stentiford, et al., U.S. patent application Ser. No. 10/784,727 directed to "Dynamic Language Translation of Web Site Content" to Travleso, et al., and U.S. patent application Ser. No. 12/020,496 directed to "Method and System for Providing Translated Dynamic Web Page Content" to Jurach, et al.

Such automatic website translation systems rely on computer translations on-the-fly and are generally known in the art to be inaccurate or otherwise unreliable. Computer-based translations such as the ones referenced above generally are inadequate in distinguishing and translating nuances of a language that a human would otherwise readily grasp.

Popup language translations for computers are also known in the art as described in U.S. patent application Ser. No. 12/481,635 directed to "Dynamic Screentip Language Translation" to Fitzpatrick, et al. Also in the art, there exists services such as Voxy (http://www.voxy.com) which focuses primarily on machine translations of small fragments of content. However, none of these tools are believed to provide the immersion necessary to facilitate comprehensive and expeditious language learning.

SUMMARY

Systems and methods described herein are directed to solving a deficiency in the art of language learning. Such deficiencies include the lack of immersion into the language sought to be learned or inadequate context. The disclosed method contemplates that a user read written content, such as a news article, in a first language. The content can be sourced from any number of content sources, such as a news outlet or other Internet websites. The content is then typically translated by a human translator into translated content in a second language. The translated content is stored alongside the content initially hidden from the user. In addition, the translator can create digital audio tracks of the translated content and this audio content can also be stored alongside the other content and be available to the user upon request (e.g., clicking on an audio icon).

The user typically has an input device, such as a mouse or touchscreen, to identify a content component in the first language to be displayed in the second language, wherein the content component is a word or a phrase. A popup box may appear above or below the news article with the sentence translated in the second language. Within the popup box, the previously identified content component, in the second language, is highlighted in and the word or phrase that the user has identified is also highlighted to show the correspondence between the two languages and to provide a contextual translation. Alternatively, the translation may appear in a fixed box below the text.

In another aspect, the systems and methods disclosed herein are also directed to the creation and utilization of electronic flashcards to further language learning. Within the content, the user may use the input device to click onto the content component to identify what is to be kept in a flashcard database. The user may access the previously stored electronic flashcard and review the content component in the first language compared to the second language. The user can then designate the degree of difficulty of the content component on the electronic flashcard, thereby allowing the program to know how often to show the user said electronic flashcard.

Further, the systems and methods disclosed herein can also be directed to a social network allowing users to communicate with other language learners, including through platforms like Facebook. Users may practice the language skills they have acquired by discussing the content they have read in a language exchange style discussion with anyone, including users who have read the same content and/or listened to related audio of the same content. This language exchange style discussion can lead to more efficient and faster learning of a target language.

Finally, the systems and methods disclosed herein can also be directed to increasing user engagement in language learning through predicting and recommending content a user may prefer to read or hear, as well as recommending other language learners with whom the user may prefer to interact. Such a recommendation system can be used to ensure that users get content that is interesting to them based on what they interact with, in one embodiment, taking into account how users who have interacted with similar sets of content interacted with the rest of the content in the system.

An exemplary method in accordance with the disclosure includes receiving first content information in a first language. The first content information includes at least one paragraph, the at least one paragraph includes at least one sentence and the at least one sentence includes a first plurality of words. The method further includes: receiving input specifying a phrase included within the first content information where the phrase includes ones of the first plurality words; receiving a translated phrase corresponding to the phrase, the translated phrase comprising a second plurality of words in a second language; storing, within a memory, correspondence information mapping one or more of the second plurality of words to one or more of the first plurality of words; and storing, within the memory, the first content information and the translated phrase in association with the correspondence information so as to form dual language content associated with the first content information.

An exemplary method of presenting dual language content in accordance with the disclosure includes retrieving digital content from a memory, the digital content including textual information in a first language. The method further includes rendering, by a display of a device, an image of the digital content in the first language; receiving, from an input device coupled to the display, an indication that a specified portion of the textual information is to be displayed in a second language, the specified portion comprising at least one of a word within a phrase and the phrase; retrieving, from the memory, correspondence information stored in association with the specified portion, the correspondence information identifying at least a translated phrase in a second language corresponding to the specified portion; and rendering an image of the translated phrase on the display in proximity to the specified portion. The correspondence information includes information mapping one or more of a plurality of words in the translated phrase to respective one or more words in the specified portion of the digital content.

Another exemplary method in accordance with the disclosure includes: retrieving digital content from a memory, the digital content comprising textual information in a first language; rendering, by a display device, an image of the digital content in the first language; receiving, from an input device, an indication that a specified portion of the textual information is to be included in a flashcard database; and retrieving, from the memory, correspondence information stored in association with the specified portion. The correspondence information indicates a translated phrase in a second language corresponding to the specified portion and stored in the memory in association with the correspondence information. The method further includes: retrieving from the memory and based on the correspondence information, translation information representing the translated phrase in the second language; and storing, in a flashcard database, first information representing the specified portion in the first language and the translation information. The correspondence information includes first correspondence information identifying a paragraph number and a sentence number in the paragraph to which the translated phrase corresponds, and second correspondence information mapping one or more of a plurality of words in the translated phrase to respective one or more words in the specified portion of the digital content.

Another exemplary method in accordance with the disclosure includes: rendering, on a display device, content in a first language; receiving user input indicating that a specified portion of the content is to be displayed in a second language; retrieving correspondence information stored in association with the specified portion; retrieving, from a memory and based upon the correspondence information, a translated content portion in the second language; and rendering, on the display device, the translated content portion in proximity to the specified portion.

Another exemplary method in accordance with the disclosure includes: rendering, on the display device, at least one question regarding the content in the first language; receiving a user input response to the at least one question; and rendering, on the display device, additional content in the first language, wherein the additional content is of a difficulty level determined based on correctness of the user input response to the at least one question.

Yet another exemplary method in accordance with the disclosure includes: rendering, on a display device, content in a first language; receiving user input indicating that a specified portion of the content is to be included within a flashcard database; retrieving correspondence information stored in association with the specified portion; retrieving, from a memory and based upon the correspondence information, a translated content portion in a second language; and storing, in the flashcard database, flashcard information representative of the specified portion and the translated content portion.

An exemplary system in accordance with the disclosure includes memory and a processor coupled to the memory. The processor is configured to receive first content information in a first language, the first content information including at least one paragraph, the at least one paragraph comprising at least one sentence, the at least one sentence comprising a first plurality of words, receive input specifying a phrase included within the first content information wherein the phrase includes ones of the first plurality words, receive a translated phrase corresponding to the phrase, the translated phrase comprising a second plurality of words in a second language, store, within the memory, correspondence information mapping one or more of the second plurality of words to one or more of the first plurality of words, and store, within the memory, the first content information and the translated phrase in association with the correspondence information so as to form dual language content associated with the first content information.

Another exemplary system in accordance with the disclosure includes memory and a processor coupled to the memory. The processor is configured to retrieve digital content from the memory, the digital content comprising textual information in a first language, cause a display of a device to render an image of the digital content in the first language, receive, from an input device coupled to the display, an indication that a specified portion of the textual information is to be displayed in a second language, the specified portion comprising at least one of a word within a phrase and the phrase, retrieve, from the memory, correspondence information stored in association with the specified portion, the correspondence information identifying at least a translated phrase in a second language corresponding to the specified portion, and cause the display to render an image of the translated phrase in proximity to the specified portion. The correspondence information includes information mapping one or more of a plurality of words in the translated phrase to respective one or more words in the specified portion of the digital content.

Another exemplary system includes a memory and a processor coupled to the memory. The processor is configured to retrieve digital content from the memory, the digital content comprising textual information in a first language, cause a display device to render an image of the digital content in the first language, receive, from an input device, an indication that a specified portion of the textual information is to be included in a flashcard database, retrieve, from the memory, correspondence information stored in association with the specified portion, the correspondence information indicating a translated phrase in a second language corresponding to the specified portion and stored in the memory in association with the correspondence information, retrieve from the memory and based on the correspondence information, translation information representing the translated phrase in the second language, and store, in a flashcard database, first information representing the specified portion in the first language and the translation information. The correspondence information includes: first correspondence information identifying a paragraph number and a sentence number in the paragraph to which the translated phrase corresponds, and second correspondence information mapping one or more of a plurality of words in the translated phrase to respective one or more words in the specified portion of the digital content.

Another exemplary system in accordance with the disclosure includes a memory and a processor coupled to the memory. The processor is configured to cause a display device to render content in a first language, receive user input indicating that a specified portion of the content is to be displayed in a second language, retrieve correspondence information stored in association with the specified portion, retrieve, from the memory and based upon the correspondence information, a translated content portion in the second language, and cause the display device to render the translated content portion in proximity to the specified portion.

Yet another system in accordance with the disclosure includes a memory, and a processor coupled to the memory. The processor is configured to cause a display device to render content in a first language, receive user input indicating that a specified portion of the content is to be included within a flashcard database, retrieve correspondence information stored in association with the specified portion, retrieve, from the memory and based upon the correspondence information, a translated content portion in a second language, and store, in the flashcard database, flashcard information representative of the specified portion and the translated content portion.

A non-transient computer readable medium in accordance with the disclosure stores program code which, when executed by a processor, causes the processor to: cause a display device to render content in a first language; receive user input indicating that a specified portion of the content is to be displayed in a second language; retrieve correspondence information stored in association with the specified portion; retrieve, from the memory and based upon the correspondence information, a translated content portion in the second language; and cause the display device to render the translated content portion in proximity to the specified portion.

Yet another non-transient computer readable medium in accordance with the disclosure stores program code which, when executed by a processor, causes the processor to: cause a display device to render content in a first language, receive user input indicating that a specified portion of the content is to be included within a flashcard database, retrieve correspondence information stored in association with the specified portion, retrieve, from the memory and based upon the correspondence information, a translated content portion in a second language, and store, in the flashcard database, flashcard information representative of the specified portion and the translated content portion.

BRIEF DESCRIPTION OF THE DRAWINGS

The novel features of the systems and methods disclosed herein, both as to structure and operation, will be best understood from the accompanying drawings, taken in conjunction with the accompanying description, in which similar reference characters refer to similar parts, and in which:

FIG. 14 shows three screenshots presented to a user as part of a test of comprehension after the user has read and/or listened to content created by the process of FIG. 4;

FIG. 15 shows a screenshot showing a view of a history of results of tests of comprehension completed by a user.

DETAILED DESCRIPTION

As is discussed below, in one aspect the present disclosure relates to systems and methods that enable translators to create multiple representations of content in multiple languages and link translations of contextual phrases of the multiple representations to each other such that users can read content in a first language and selectively display a translation of the phrases in a second language. These systems and methods enable a user to learn a language by interacting with content (e.g., a news article) (hereafter digital content) rendered by a website. The content may be acquired through a content source which can provide written content such as blog posts, entertainment media, news articles, educational texts, technical papers, or any type of digital information relating to any number of topics including, but not limited to, current events, politics, science or the media. In addition, the digital content may be obtained from music videos, songs, and/or other video and audio content by first creating transcribed text which is then translated into lyrics (or a discussion, in the case of a non-music video or audio clip). This allows for better content-based learning by allowing the user to become immersed in the first language through use of actual content that could be normally read by a native speaker of the first language.

The systems and methods also provide for a user to customize electronic flashcards to further language learning. Within the content, the user may use the input device to click or tap onto the content component to identify what is to be kept in a flashcard database. The user may access the previously stored electronic flashcard and review the content component in the first language compared to the second language. The user can then designate the degree of difficulty experienced in recalling the content component in the second language, thereby allowing the program to determine how often to show the user said electronic flashcard.

Figure 1:
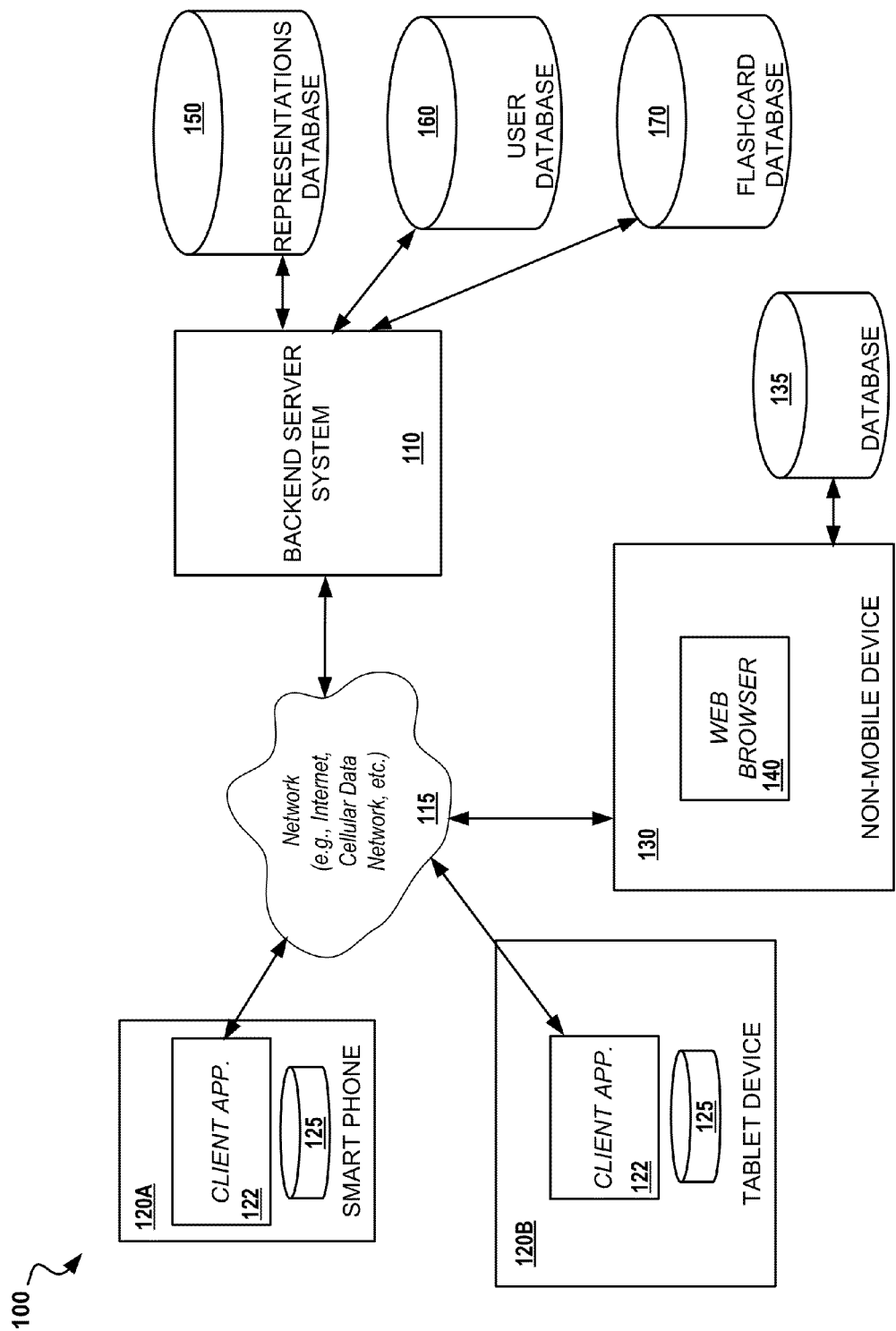
FIG. 1 illustrates details of a system on which embodiments of the methods described herein may be implemented.
Figure 2:
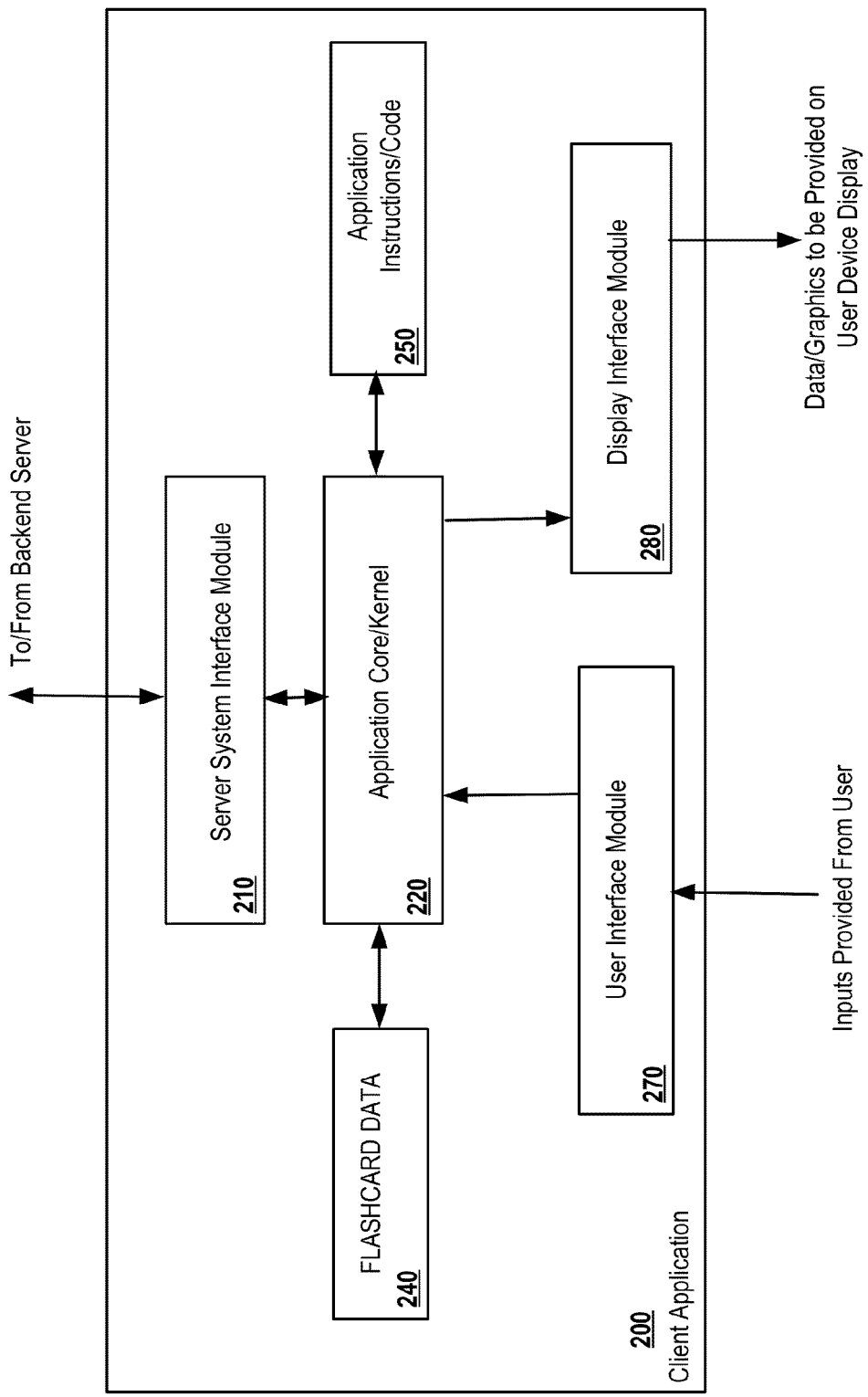
FIG. 2 illustrates details of an embodiment of an example client application for use on a user device.
Figure 3:
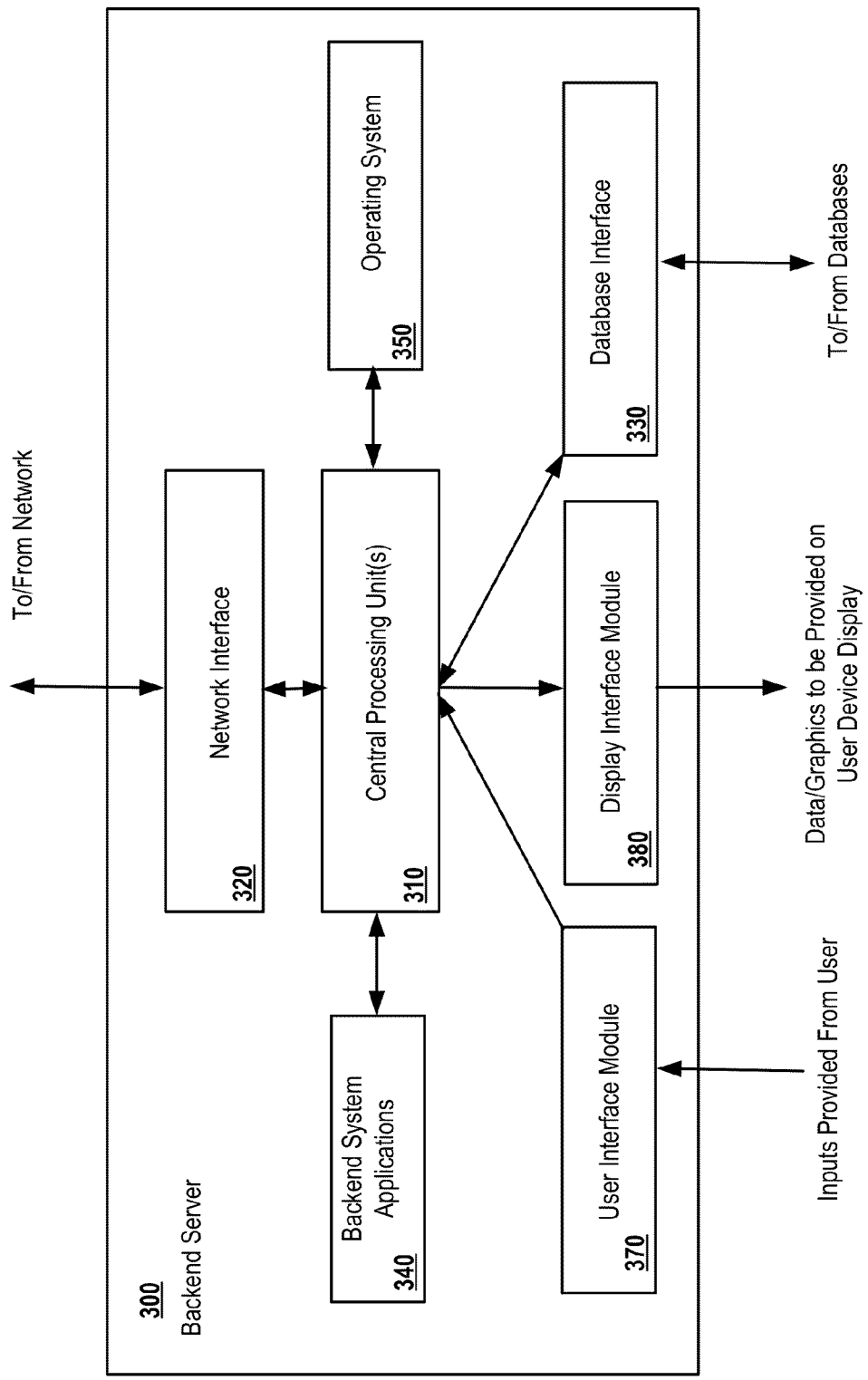
FIG. 3 illustrates details of an example server system for use with a client application such as shown in FIG. 2.

Before further describing various aspects and functionality of the language learning methods described herein, it may be helpful to describe the general context and systems and devices on which embodiments may be implemented as shown in FIGS. 1 through 3.

For example, FIG. 1 illustrates details of a system 100 on which various embodiments may be implemented. System 100 includes one or more (typically many) mobile user devices 120, which may be netbooks, smart phones, personal digital assistants (PDAs), tablets, or other similar or equivalent mobile devices. As shown in FIG. 1, user device 120A is a smart phone and user device 120B is a tablet device, each of which includes a client application 122, which may be a customized application configured to utilize an operating system of the smart phone 120A or the tablet device 120B. The client application 122 enables the smart phone 120A or the tablet device 120B to gain access to a central server system such as backend server system 110. In addition to mobile user devices 120, the system 100 includes non-mobile devices 130. Such non-mobile devices 130 may include desktop or notebook computers, for example. Non-mobile user device 130 uses a standardized web browser application 140, such as the Internet Explorer, Firefox, or Chrome browsers. Each of user devices 120A, 120B and non-mobile device 130 may communicate with the server system 110 via connections with a network 115, such as the Internet and/or another network such as a cellular data network, to server system 110.

Server system 110 may include or be connected to one or more databases. The exemplary system 100 includes a representations database 150, a user database 160 and a flashcard database 170. The representations database 150 includes various representations of content such as news articles, stories, etc. The representations are generally dual language representations created using methods described below, although in other embodiments the representations may be comprised of content corresponding to more than two languages. The dual language representations are each configured to display respective textual content in a first language and selectively display translated portions of the content upon request by a user using an input device such as a mouse or touch screen display. The representations for a particular news article or story can include individual representations for a plurality of first and second languages (e.g., a first representation where the first language is English and correspondence information points to portions of a second representation in Spanish, and the second representation where the first language is Spanish and correspondence information points to portions of the first representation in English (and/or to portions of a third representation in German).

In addition to storing multiple different first and second language representations, the representations database 150 may store multiple representations of a particular news article or story for a particular pair of languages in multiple complexities such as, for example, an easy representation and a difficult representation. The multiple level of difficulty representations may be prepared by a translator by removing content from a news article or story or by using simpler vocabulary and/or sentence structures when translating the content.

The user database 160 stores information regarding individual users of the system 100. The user information can include content preferences such as likes and dislikes that the user has selected. The user information can also include other users that the user has communicated with.

The flashcard database 170 stores information representing the user selected flashcards that an individual user has previously created from the dual language representations that the user has previously read. Each user can access the previously created flashcards on a daily basis, or more or less frequently, in order to practice the first language. Details of an exemplary implementation of the flashcard method are described below.

Server system 110 will generally include other data storage devices as well as associated hardware, software, memory, peripheral interface devices, and the like, including modules to receive and store data and information, receive and process input from user devices and associated browsers or client applications, and receive and configure information from translators to create the dual language representations using the methods described below.

At user devices 120A and 120B, the client application program 122 may be downloaded and stored on the user device 120 to allow customized access to data and information on the server system 110. The client application program 122 is stored in memory 125. The memory 125 can also store previously downloaded representations and user created flashcards. Alternately, or in addition, the standardized browser application 140 (as shown in non-mobile user device 130) may be provided to allow standardized web access and associated functionality in some implementations. Previously downloaded representations and previously created flashcards are stored in a database 135 coupled to or included in the non-mobile device 130.

FIG. 2 illustrates details of an embodiment of a client application 200 and associated functional modules. Client application 200 may correspond with the client application 122 as shown in FIG. 1. Client application 200 may include a server system interface module 210 configured to provide an interface or data interchange with an associated server system, such as a server system 110 of FIG. 1. This interface functionality may be provided by other software and/or hardware modules in the particular user device, such as operating system functions, wired or wireless interface hardware and software, and the like. Application 200 may also include an application core or kernel module 220 configured to perform the basic functionality described subsequently with respect to client application 122 and/or user device operation. In particular, this functionality may be as illustrated in the figures and described subsequently herein. Client application 200 may further include a representation/flashcard data module 240 to store data associated with the client application, such as dual language representations previously downloaded by a user, flashcard data created by the user based on dual language representations, data being processed by the application core 220, data received from the server system 110, and/or other data or information. In addition, client application 200 may include application instructions or computer code in a code or instruction module 250. The code or instruction module 250 may include a specific series of instructions and steps to perform the functions described subsequently herein. The computer code or instructions may be stored on a computer readable medium configured to provide instructions to a processor or other similar or analogous device, such as a programmable logic device, DSP, etc.

Client application module 200 may further include a user interface module 270 configured to receive input from a user, such as user selections, search data or information, or other information provided from a user. In addition, the client application module 200 may include a display interface module 280 configured to provide output information to a user on a display device (not shown) of a user device, such as an LCD or other display screen.

FIG. 3 illustrates one embodiment of details of aspects of a server system 300, which may correspond with server system 110 of FIG. 1. Server system 300 may include a core functional module or kernel 310, which may be configured as a module to control overall operation of the system as well as support functionality as described subsequently herein. The core module 310 utilizes functions provided by an operating system 350. A backend system applications module 340 may be coupled to core module 310 to enable user selection of or targeted selection of content for delivery to users. The backend systems applications module 340 may be coupled to databases via a database interface 330. The database interface can be coupled to databases such as the representations database 150, the user database 160 and the flashcard database 170 of FIG. 1.

Additional interface modules may be included in server system 300, either configured separate or integrated in functionality with other modules. For example, a user may access the system through a user device interface 370, which may be operated in conjunction with a client application executing on a user device and/or a web browser. In addition, a translator can access the backend server applications module 340 via the user interface module 370 in order to create the dual language representations of content. A display interface module 380 provides data and graphics information to be displayed on a display device of a user device or a display device used by a translator.

The backend system applications module 340 may comprise non-transitory computer-readable storage media, such as memory devices or other storage components to store instructions for execution by computer processors. The instructions may be used to implement the various functions described subsequently herein.

Figure 4:
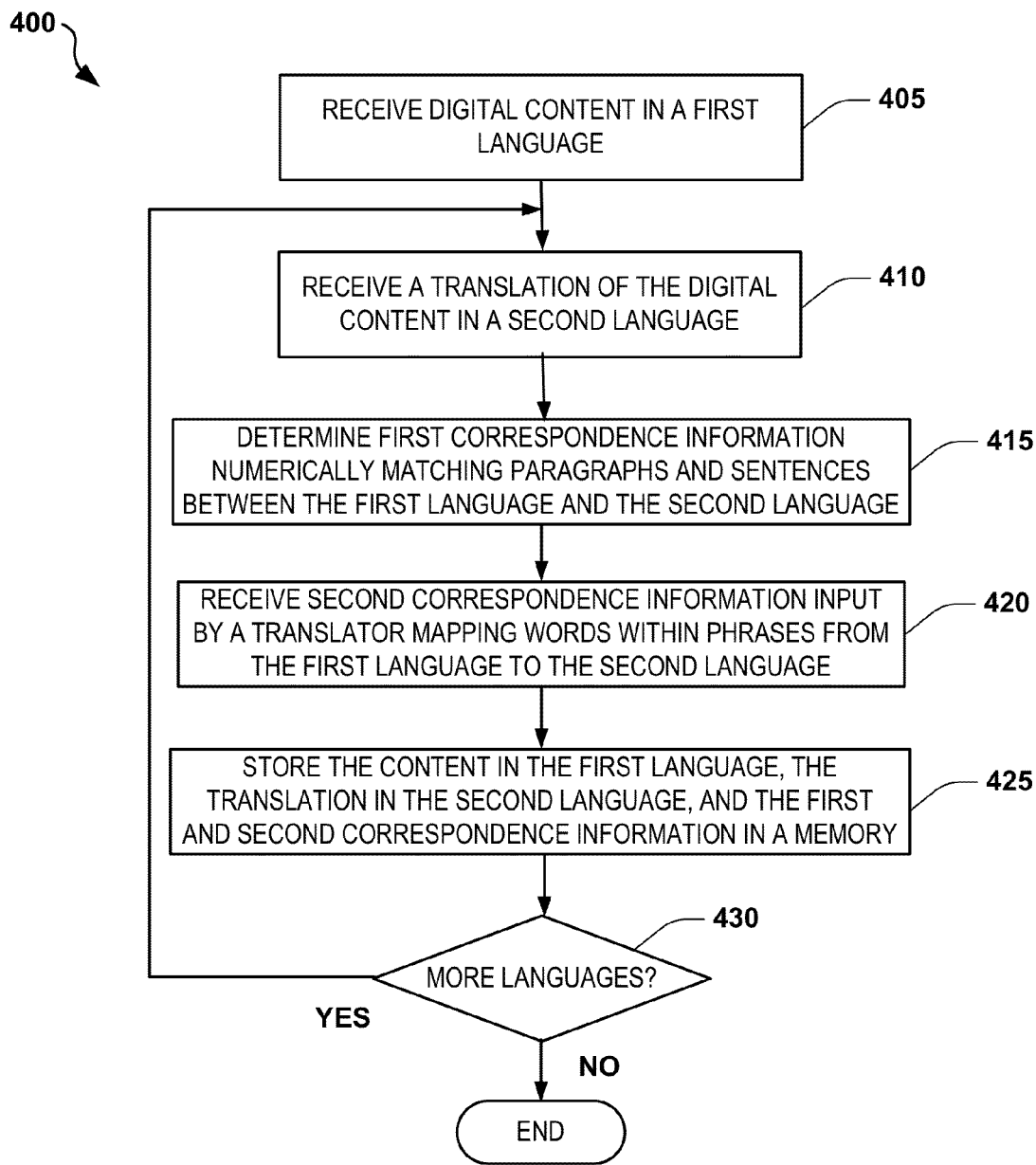
FIG. 4 is a flowchart illustrating an exemplary process for creating dual language content in accordance with the disclosure.

Referring to FIG. 4, a flowchart illustrating an exemplary process 400 for creating dual language content in accordance with the disclosure is shown. The process 400 can be performed by a central system such as the backend server systems 110 or 300 (referred to collectively as the server system from herein). The process 400 could also be performed on one of the mobile devices 120A or 120B using the client application 122 or 200, or by the non-mobile device 130 using the web browser 140. When being performed by one of the mobile devices 120A or 120B or by the non-mobile device 130 (referred to collectively as user devices from herein), information can be communicated to and from the backend server system 110 or 300 when a connection is available via the network 115.

The process 400 starts at stage 405 where a communication device (e.g., one of the mobile devices 120, a non-mobile device such as the non-mobile device 130 or the server system 110 or 300) operating the client application 122 receives digital content in a first language, also referred to as the target language that a user is learning. The digital content comprises textual information, or other media with which textual content may be associated, such as the aforementioned songs, music videos, and other video clips, in the first language. The textual information includes at least one paragraph. Each of the paragraphs includes at least one sentence and each sentence includes one or more phrases, each phrase comprising one or more words.

At stage 410, the content in the first/target language is translated to a second language which is referred to as the source language. The second/source language is typically a language that that a user speaks fluently or at least at a level higher than the user speaks the first/target language. The content is translated by a translator, typically a human, and this translated content is received as input to the client application 122 at the communication device. Similar to the content that is received at stage 405, the translated content is made up of at least one paragraph, wherein the at least one paragraph comprises at least one sentence. The at least one sentence is further broken down to a plurality of content components which can either be a word or a phrase. A word is a string of characters, terminated by whitespace in most, but not all languages, and a phrase is a string of the words wherein the string need not necessarily be continuous within the context of a sentence. When the communication device is one of the mobile devices 120 or the non-mobile device 130, the translated content is communicated to the server system and is stored within the representations database 150 in association with a user account that is identified in the user database 160.

At stage 415, the client application 122 determines first correspondence information matching paragraphs and sentences between the original content in the first/target language and the translated content in the second/source language. The first correspondence information is typically simply a numerical index indicating the numerical order of appearance of paragraphs and sentences within each of the paragraphs between the contents of the first/target and second/source languages.

At stage 420, the application 122 receives second correspondence information input by the translator. The second correspondence information may, for example, map words within phrases from the first/target language to the second/source language. In contrast to the first correspondence information matching the paragraphs and sentences, the second correspondence information is not a simple numerical order of appearance. This is due to the different grammatical constructs of different languages. For example, in English, adjectives often appear prior to a noun whereas in Spanish, adjectives follow the noun.

Figure 5:
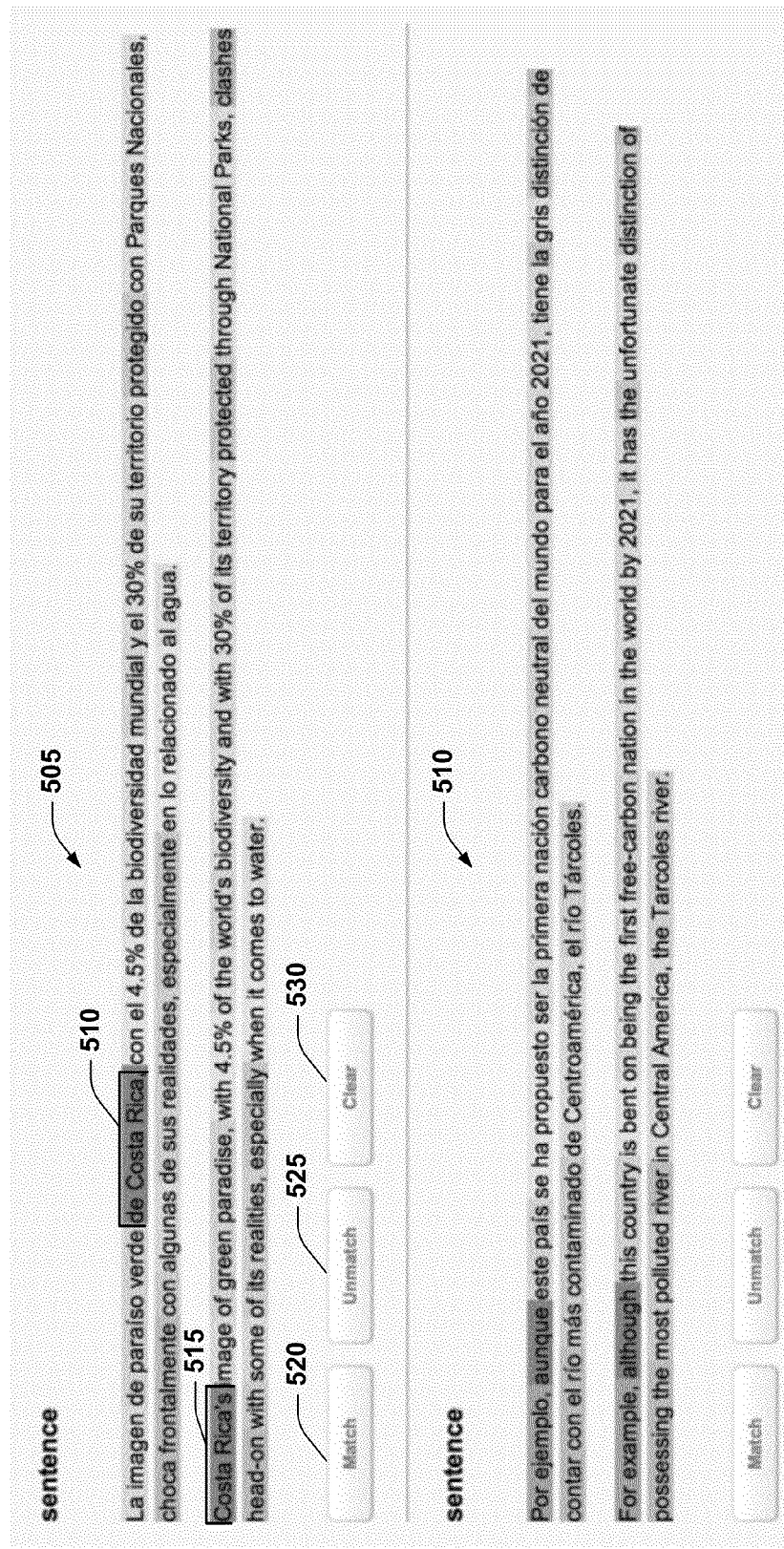
FIG. 5 is an illustration of a screenshot of a user interface used to input correspondence information matching words from a sentence in a first language to words in a corresponding sentence in a second language.

Referring to FIG. 5, there is shown a screen shot of a user interface screen 500 usable to input the second correspondence information at stage 420. The screen shot 500 shows a first sentence pair 505 that includes a Spanish language sentence and a corresponding English language sentence. These sentences have been linked to each other via the first correspondence information determined at stage 415.

The translator selects one or more words in the Spanish sentence by highlighting the words using a mouse and cursor (not shown) or using a touch screen, for example. In the example screen shot 500, the translator has selected the words "de Costa Rica," in the Spanish sentence and the words "Costa Rica's" in the English sentence. After selecting both sets of words, the translator activates a "Match" button 520 in order to link the selected sets of words via with the second correspondence information. This second correspondence information includes a position in each sentence of the selected words. This second correspondence information is then stored in memory in association with the first correspondence information for the sentence pair which includes a paragraph number and a sentence number indicating the order of appearance.

The translator continues to select and match one or more words of the sentence in the first/target language to one or more words of the sentence in the second/source language until all the words are matched. An "Unmatch" button 525 can be used to remove a matching correspondence between a set of already matched words in order to correct an error. A "Clear" button 530 can be used to remove all matching correspondences for a pair of sentences 505 or 510. The screenshot 500 can illustrate different correspondences between a sentence pair using different colored highlights. An unmatched word is indicated by having no color or by having a designated color such as red, for example.

In addition to matching words from one language to another at stage 420, the translator also matches phrases from a sentence in the first/target language to phrases in the sentence of the second/source language. A sentence is made up of at least one phrase. This matching of phrases is also represented by the second correspondence information.

Upon matching all the words within phrases and all the phrases from the first/target language to the second/source language at stage 420, the process 400 continues to stage 425. At stage 425, the client application 122 stores the original content in the first/target language, the translated content in the second/source language, and the first and second correspondence information in a memory such as the representation database 150. This combination of content in two languages and the first and second correspondence information is referred to as a representation of the original content received at stage 405. This representation is referred to as a dual language representation of a piece of content. In one embodiment, the representations are stored in a relational database which is described below.

Figure 6:
FIG. 6 is a screenshot of content in a first language and a popup box featuring a translated content in a second language.

By creating the dual language representation as described herein, a user can read the original content in the first/target language and then choose to see the translated content in the second/source language by simply hovering a cursor over a word or phrase or by selecting using a touch screen. In one embodiment, when the content component is hovered over with the mouse or selected with a touch screen, the original content component in the first/target language is highlighted and a popup box appears above the content component providing a translation of the content component in context of the sentence in the second/source language. FIG. 6 is a screenshot 600 showing content in the first/target language (Spanish, in this example) and a popup box 605 featuring a translated content in the second/source language (English, in this example). The popup box 605 appears in response to a cursor 610 hovering over on or more words in a phase that corresponds to the translated phrase in the popup box 605. In this example, the cursor 610 is hovering over "para" in the Spanish content.

Presenting the popup box 605 in the second/source language above the content in the first/target language allows the user to compare the text in the first/target language to the text in the second/source language. This allows users of varying levels of proficiency to use the same content to learn a language. The content can also be kept up-to-date at stage 405 with current events or relevant information. Information can be obtained at stage 405 from several sources including, but not limited to, social media and news media sources. Information can be determined to be relevant based on a popularity of a story across these social media and news media sources.

At decision block 430, the translator indicates via an input device whether there are more languages to translate the original content into so as to form more representations. If the translator indicates that there are more languages, the process continues back to stage 410 to repeat the stages 410-430 for a second/source language. If the translator indicates that there are no more languages to translate, the process 400 terminates.

In addition to creating multiple representations for a given piece of content received at stage 405, the process 400 can be repeated multiple times for different difficulty levels associated with the same original content. For example, the process 400 can receive a linguistically simpler version, or more complex version, of the content at stage 405 and repeat the process 400 with the simpler or more complex version of the content. This allows for creation of a plurality of representations at different difficulty levels (e.g., easy, medium, difficult). The different difficulty level versions of content can be created by a translator removing sentences, portions of sentences or by substituting simpler vocabulary for more complex vocabulary. Other methods of creating multiple difficulty levels of content can also be used at stage 405.

The process 400 is performed, in one embodiment, by a translator. The translation performed by a human translator will almost always be a better translation than a computer-based translation provided through automated means. The human translator will be able to recognize and identify the nuances of the first/target and second/source languages allowing the translation to be effective in language learning. In other embodiments, a machine translator can be used for at least a part of the process 400.

The process 400 is exemplary only and modifications to the process can be made without departing from the scope of the methods described herein. For example, stages may be omitted, added or rearranged.

Figure 7:
FIG. 7 is an entity relationship diagram (ERD) illustrating an exemplary relational database that is used to match dual language components in accordance with the disclosure.

As discussed above in reference to stage 425 of the process 400, the dual language representation, including content in the first/target language, translated content in the second/source language, and the first and second correspondence information is stored in a relational database. Referring to FIG. 7, an entity relationship diagram (ERD) 700 is shown. The ERD 700 uses crow's foot notation. The ERD 700 illustrates an exemplary relational database that is defined by the following database schema code:

---

Database schemas for core tables are below

```
CREATE TABLE 'nulu_stories' (
    'id' int(10) unsigned NOT NULL AUTO_INCREMENT,
    'created_at' datetime NOT NULL,
    'updated_at' datetime NOT NULL,
    'publish_at' datetime DEFAULT NULL,
    'source_id' int(10) unsigned NOT NULL,
    'category id' int(10) unsigned NOT NULL,
    PRIMARY KEY ('id'),
    KEY 'index_nulu_stories_source' ('source_id'),
    KEY 'index_nulu_stories_category' ('category_id'),
    CONSTRAINT 'nulu_stories_category_fk' FOREIGN KEY
    ('category_id')
REFERENCES 'nulu_story_categories' ('id') ON DELETE NO
ACTION ON UPDATE NO ACTION,
    CONSTRAINT 'nulu_stories_source_fk' FOREIGN KEY
    ('source_id')
REFERENCES 'nulu_story_sources' ('id') ON DELETE NO
ACTION ON UPDATE NO ACTION
) ENGINE=InnoDB DEFAULT CHARSET=utf8;
CREATE TABLE 'nulu_story_representations' (
    'id' int(10) unsigned NOT NULL AUTO_INCREMENT,
    'created_at' datetime NOT NULL,
    'updated_at' datetime NOT NULL,
    'story_id' int(10) unsigned NOT NULL,
    'locale_id' int(10) unsigned NOT NULL,
    'difficulty' tinyint(1) unsigned NOT NULL,
    'title_id' int(10) unsigned NOT NULL,
    PRIMARY KEY ('id'),
    UNIQUE KEY
    'unique_nulu_story_representations_representation'
('story_id','locale_id','difficulty'),
    KEY 'index_nulu_story_representations_title' ('title_id'),
    KEY 'nulu_story_representation_locale_fk' ('locale_id'),
    CONSTRAINT 'nulu_story_representations_locale_fk'
    FOREIGN KEY
('locale_id') REFERENCES 'nulu_locales' ('id') ON DELETE NO
ACTION ON UPDATE NO ACTION,
    CONSTRAINT 'nulu_story_representations_story_fk'
    FOREIGN KEY
('story_id') REFERENCES 'nulu_stories' ('id') ON DELETE NO
ACTION ON UPDATE NO ACTION,
    CONSTRAINT 'nulu_story_representations_title_fk' FOREIGN
    KEY
('title_id') REFERENCES 'nulu_sentences' ('id') ON DELETE NO
ACTION ON UPDATE NO ACTION
) ENGINE=InnoDB DEFAULT CHARSET=utf8;
CREATE TABLE 'nulu_paragraphs' (
    'id' int(10) unsigned NOT NULL AUTO_INCREMENT,
    'created_at' datetime NOT NULL,
    'updated_at' datetime NOT NULL,
    'representation_id' int(10) unsigned NOT NULL,
    'position' int(10) unsigned NOT NULL,
    PRIMARY KEY ('id'),
    UNIQUE KEY 'unique_nulu_paragraphs_position'
('representation_id','position'),
    KEY 'index_nulu_paragraphs_representation'
```

Database schemas for core tables are below

```
    ('representation_id'),
    CONSTRAINT 'nulu_paragraphs_representation_fk' FOREIGN KEY
('representation_id') REFERENCES 'nulu_story_representations'
('id') ON DELETE NO ACTION ON UPDATE NO ACTION
) ENGINE=InnoDB DEFAULT CHARSET=utf8;
CREATE TABLE 'nulu_sentences' (
    'id' int(10) unsigned NOT NULL AUTO_INCREMENT,
    'created_at' datetime NOT NULL,
    'updated_at' datetime NOT NULL,
    'paragraphed_id' int(10) unsigned DEFAULT NULL,
    'position' int(10) unsigned NOT NULL,
    PRIMARY KEY ('id'),
    UNIQUE KEY 'unique_nulu_sentences_position'
('paragraph_id','position'),
    KEY 'index_nulu_sentences_paragraph' ('paragraph_id'),
    CONSTRAINT 'nulu_sentences_paragraph_fk' FOREIGN KEY
('paragraph_id') REFERENCES 'nulu_paragraphs' ('id')
ON DELETE NO ACTION ON UPDATE NO ACTION
) ENGINE=InnoDB DEFAULT CHARSET=utf8;
CREATE TABLE 'nulu_sentence_words' (
    'id' int(10) unsigned NOT NULL AUTO_INCREMENT,
    'created_at' datetime NOT NULL,
    'updated_at' datetime NOT NULL,
    'text' varchar(2048) NOT NULL,
    'sentence_id' int(10) unsigned NOT NULL,
    'position' int(10) unsigned NOT NULL,
    'phrase_id' int(10) unsigned NOT NULL,
    PRIMARY KEY ('id'),
    UNIQUE KEY 'unique_nulu_sentence_words_position'
('sentence_id','position'),
    KEY 'index_nulu_sentence_words_sentence' ('sentence_id'),
    KEY 'index_nulu_sentence_words_phrase' ('phrase_id'),
    CONSTRAINT 'nulu_sentence_words_phrase_fk' FOREIGN KEY
('phrase_id') REFERENCES 'nulu_phrases' ('id') ON DELETE NO
ACTION ON UPDATE NO ACTION,
    CONSTRAINT 'nulu_sentence_words_sentence_fk' FOREIGN KEY
('sentence_id') REFERENCES 'nulu_sentences' ('id') ON DELETE
NO ACTION ON UPDATE NO ACTION
) ENGINE=InnoDB DEFAULT CHARSET=utf8;
CREATE TABLE 'nulu_phrases' (
    'id' int(10) unsigned NOT NULL AUTO_INCREMENT,
    'created at' datetime NOT NULL,
    'updated_at' datetime NOT NULL,
    PRIMARY KEY ('id')
) ENGINE=InnoDB DEFAULT CHARSET=utf8;
```

The ERD 700 shows a series of related tables including a story table 710, a story representation table 720, a paragraph table 730, a sentence table 740, a sentence word table 750 and a phrase table 760. The story table 710 includes an "id" variable that stores a numerical identifier for each piece of content (i.e., a story) that uniquely identifies a single piece of content. The story table 710 also includes, for each unique story_id, a "created_at" variable storing the date and time (in DATETIME format) that the story was first created, an "updated_at" variable storing the date and time the story was last modified or updated, a "publish_at" variable storing the date and time the story was first published to the website of the backend server 110 or 300, a "source_id" variable storing a numerical identifier indicating a source from which the story was obtained and a :category_id" variable storing a numerical identifier indicating a category in which the story is classified.

A crow's foot association 715 indicates that one and only one story is linked to one or more representations of that story in the story representations table 720. This indicates that each unique story in the story table 710 can be related to multiple dual language representations and level of difficulty representations identified in the story representation table 720. Each representation in the representation table 720 is identified by a representation "id" variable. Each representation is also characterized by a "created_at" and an "updated_at" variable. A "story_id" variable indicates which story in the story table 710 a particular representation is related to. A "locale_id" variable indicates a language/regional dialect that the representation is written. A "difficulty" variable indicates to which of a plurality of difficulty levels (e.g., easy and difficult) a representation is classified. A "title_id" variable relates each representation to an index of titles.

The representation table 720 is linked by a one and only one to one or more association 725 to the paragraph table 730. This association 725 indicates that each representation includes one or more paragraphs where each paragraph is identified by a paragraph "id" variable in the paragraph table 730. Some representations, e.g., easy representations, may be missing some of the paragraphs that are in the original story and/or the difficult representation of the original story. The paragraphs are each characterized by a paragraph "id" identifier, a "created_at" variable, and an "updated_at" variable. In addition, each paragraph is indicated to be related to a particular representation in the story representation table 720 by a "representation_id" variable. Further, a numerical order of appearance of the paragraph within the representation is identified by a "position" variable.

The paragraph table 730 is linked by a one or none to one or more association 735 to the sentence table 740. This association 735 indicates that each sentence in the sentence table 740 is related to one or none of the paragraphs, as indicated by a "paragraph_id" variable in the sentence table 740. Some sentences may be omitted from one representation but not another. For example, a difficult representation may include more sentences in a given paragraph at a given location than an easy representation. The sentences are each characterized by a "paragraph_id" identifier indicating to which paragraph in the paragraph table 730 a sentence belongs, and a "position" variable in the sentence table 740 indicates a numerical order of appearance of the sentence in the indicated paragraph. The sentences are also characterized by a "created_at" variable, and an "updated_at" variable. Further, a numerical order of appearance of the paragraph within the representation is identified by a "position" variable.

The sentence table 740 is linked by a one and only one to one or more association 745 to the sentence words table 750. This association 745 indicates that each sentence in the sentence table is related to one or more words in the sentence words table 750. Different sentences in the sentence table 740 can be related to the same words in the sentence words table 750. Each word in the sentence word table 750 is identified by a word "id" variable. Each word is also characterized by a "created_at" and an "updated_at" variable. The letters or text of each unique word is stored in a "text" variable. Each word is also related to a unique sentence and a unique phrase (in the phrases table 760) as indicated by a "sentence_id" variable and a "phrase_id_variable, respectively.

The sentence words table 750 is linked by a one or more to one and only one association 755 to the phrase table 760. This association 755 indicates that each phrase as indicated by the "phrase_id" variable in the sentence word table 750 and an "id" variable in the phrase table 760, includes one or more words in the sentence words table 750. Each phrase is also characterized by a "created_at" variable and an "updated_at" variable.

The sentence table 740 is also linked to the story representation table 720 by a one and only one to one or more association 765. This association 765 indicates that one or more story representation in the story representation table 720 is related to one and only one sentence in the sentence table 740. This association links the "title_id" variable in the story representations table 720 to one sentence in the sentence table 740, the one sentence being the title of the one or more representations. For example, an original story in the story table 710 may be related to multiple representations (multiple first/target and second/source language pairs and/or multiple difficulty levels) in the story representations table 720 and each of the multiple representations can be related to the same title sentence or a different title sentence in the sentence table 740.

Each word of the content and the translated content has an index and a position in the sentence words table 750. The index and the position can be transformed into a hash and stored in a hashmap. The index and the position of the word can be extrapolated from the hash stored in the hashmap. The client application 122 identifies specific translations using the first and second correspondence information determined at stage 415 and input by the translator at stage 420 of the process 400. Whether identified individually or as a group, the hashes are stored in the hashmap and placed in the phrase table 760 as a phrase hash. The phrase hash identifies the content component taking into account it may be possible that not all of the words within the content component are in an uninterrupted string of words.

The plurality of matches input by the translator using the user interface shown in the screenshot 700 of FIG. 7 are maintained as part of the hashmap with corresponding hashes being related. This method allows content components that appear in different parts of the sentence in the original text and the translation to be matched.

The user can modify their preferences as to what is displayed in the popup box. The user may additionally specify whether just the content components are displayed or whether a definition of the content component in the first/target language is displayed in the first/target language to provide a more advanced approach to language learning.

Figure 8:
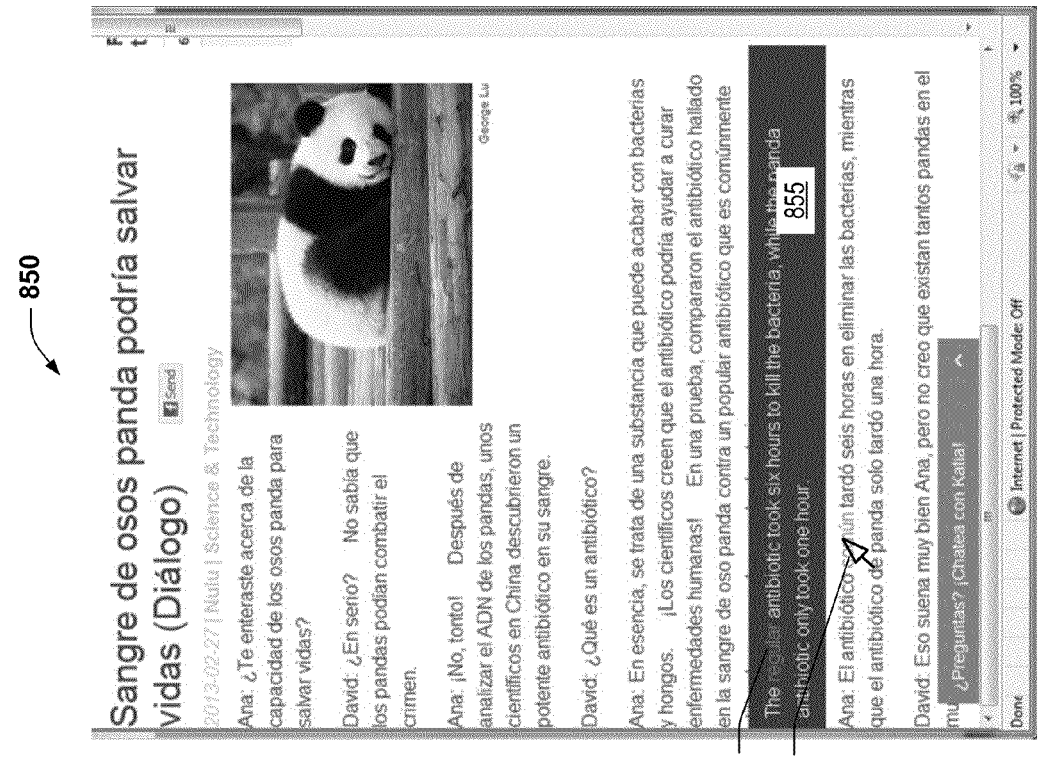
FIG. 8 shows two screenshots illustrating two exemplary representations of a piece of content, where the two representations have different primary and secondary languages.
Figure 9:
FIG. 9 shows two screenshots illustrating two exemplary representations of a piece of content, where the two representations have different levels of difficulty and different primary and secondary languages.

Examples of different representations of the same content (story) are shown in FIGS. 8 and 9. FIG. 8 shows a first representation 800 of a story where the first/target language is English and the second/source language is Spanish. A second representation 850 is shown where the first/target language is Spanish and the second/source language is English. In the first representation 800, a popup box 805 shows a sentence with the word "común" 810 highlighted in response to a user positioning a cursor 820 over the corresponding English word "regular." The second representation 850 shows a popup box 855 that lists an English version of the sentence with the word "regular" 560 highlighted in response to the user positioning a cursor 570 over the Spanish word "común."

FIG. 9 shows representations for a piece of content at different difficulty levels. FIG. 9 shows a first representation 900 of a story where the first/target language is Spanish, the difficulty level is "Difficult" and the second/source language is English. A second representation 950 is shown where the first/target language is English, the difficulty level is "Easy" and the second/source language is Spanish. As can be seen, the Difficult representation 900 includes more text than the Easy representation 950. A translator created the Easy version 950 by using simpler grammar, simpler sentence structure, and/or removing some of the text that was in the original piece of content that was used to make the Difficult representation 900. By allowing a user to choose the difficulty level, a user can avoid being discouraged by attempting to read content that is too difficult for his/her skill level, and can avoid being bored by reading content that is too easy for his/her skill level.

Figure 10:
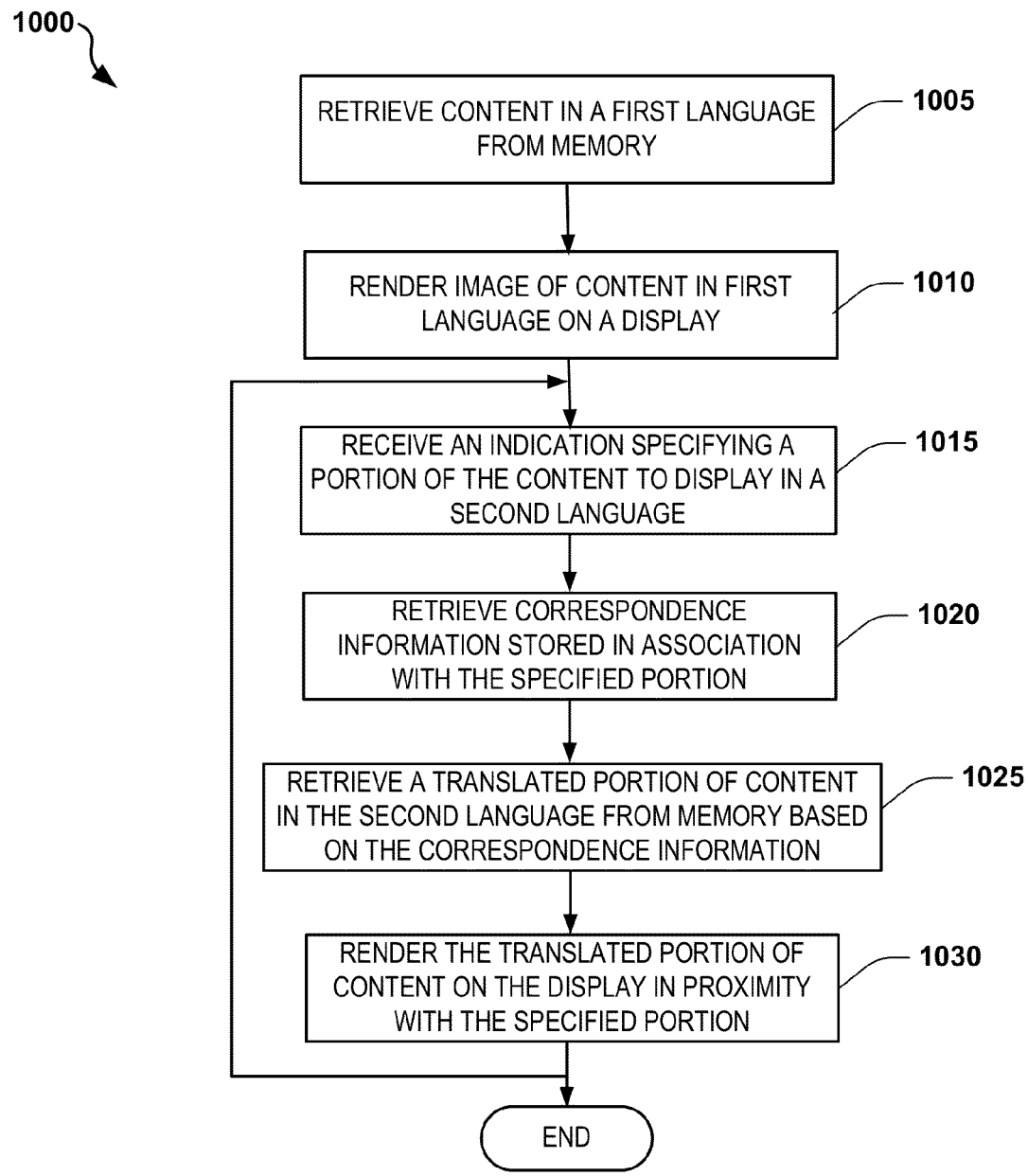
FIG. 10 is a flowchart illustrating an exemplary process for utilizing dual language content created by the process of FIG. 4.

FIG. 10 is a flowchart illustrating an exemplary process 1000 for utilizing dual language content created by the process 400 of FIG. 4. The process 1000 can be performed on one of the mobile devices 120 using the client application 122 or by the non-mobile device 130 using the web browser 140. The process 1000 starts at stage 1005 where the client application 122 retrieves a dual language content with primary text (the text displayed first) in a first/target language and translated text in a second/source language. The dual language content can be retrieved from the representations database 150 via the backend server 110. The dual language content can be one of a plurality of representations that can include different target and source languages as well as different difficulty levels. The dual language content could also be retrieved from memory 125 of one of the mobile devices 120 or from the database 135 of the non-mobile device 130.

At stage 1010, an image of the retrieved content in the first/target language is rendered on a display of the communication device that retrieved the content. At stage 1015, the client application receives an indication of input from the user of the communication device specifying a portion of the content to display in the second/source language. As discussed above, the input can be a cursor hovering over a word or phrase or the input can be a tap on a touch screen display.

Upon receiving the indication at stage 1015, the client application 122, at stage 1020, retrieves correspondence information stored in a relational database, such as the relational database illustrated in FIG. 7 and discussed above, in association with the specified portion of the content. At stage 1025, the client application 122 retrieves a translated portion of content in the second/source language from memory storing the relational database based on the correspondence information.

At stage 1030, the client application 122 causes a rendering of the translated portion to be displayed on the display in proximity to the specified portion of the primary content. The stages 1015 to 1030 are repeated until the user is finished reading the content and discards the dual language content.

The process 1000 is exemplary only and modifications to the process can be made without departing from the scope of the methods described herein. For example, stages may be omitted, added or rearranged.

Figure 11:
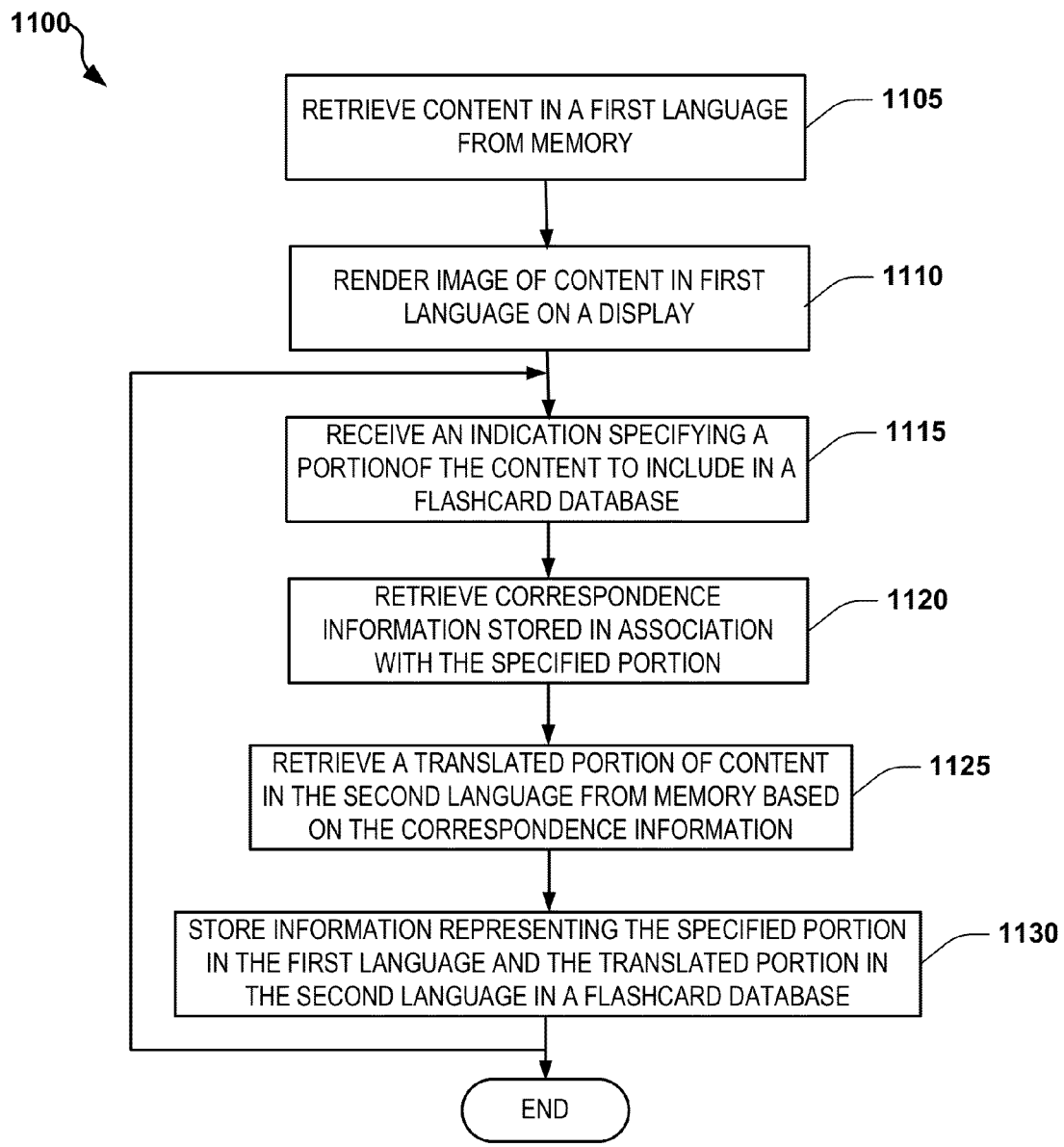
FIG. 11 is a flowchart illustrating another exemplary process for utilizing dual language content created by the process of FIG. 4.

The present system also provides a user with an opportunity to create an electronic flashcard based on the content components in the content for improved language-based assessment. Turning now to FIG. 11, there is shown a flowchart illustrating an exemplary process 1100 for utilizing dual language content created by the process 400 of FIG. 4 to create flashcards. The process 1100 can be performed on one of the mobile devices 120 using the client application 122 or by the non-mobile device 130 using the web browser 140. The process 1100 starts at stage 1105 where the client application 122 retrieves a dual language content with primary text (the text displayed first) in a first/target language and translated text in a second/source language. The dual language content can be retrieved from the representations database 150 via the backend server 110. The dual language content can be one of a plurality of representations that can include different target and source languages as well as different difficulty levels. The dual language content could also be retrieved from memory 125 of one of the mobile devices 120 or from the database 135 of the non-mobile device 130.

At stage 1110, an image of the retrieved content in the first/target language is rendered on a display of the communication device that retrieved the content. At stage 1115, the client application receives an indication of input from the user of the communication device specifying a portion of the content to include as a new flashcard in a flashcard database. The input can be a cursor hovering over a word or phrase, accompanied by a right-click command of a mouse, or the input can be a tap on a touch screen display. Alternatively, a variety of gestures could be used by a user to add flashcards to a deck. For example, a user could hold down their finger on a touch screen over a word or phrase (the content component) for an extended period of time. If the extended period of time exceeds a threshold time, the client application 122 causes a button with a label such as "Add Flashcard" to appear immediately above the content component. The user could then tap the "Add Flashcard" button in order to create the flashcard with the associated phrase.

Upon receiving the indication at stage 1115, the client application 122 retrieves correspondence information stored in a relational database, such as the relational database illustrated in FIG. 7, in association with the specified portion of the content. At stage 1125, the client application 122 retrieves a translated portion of content in the second/source language from memory storing the relational database based on the correspondence information. Alternatively the client application 122 could simply retrieve the hash of the content corresponding to the correspondence information that is stored in the relational database.

At stage 1130, the client application 122 stores information representing the specified portion in the first/target language and the translated portion in the second/source language in memory (e.g., the flashcard database 170, the memory 125 or the database 135). The stored information can be the actual text of the specified and translated portions or a hash code linking the portions in the relational database, as discussed above. The data stored in the flashcard database 170 is stored in association with an identifier identifying a user in the user database 160. In this way the user can later retrieve any flashcards that they have previously created using the process 1100 in order to practice learning.

The process 1100 is exemplary only and modifications to the process can be made without departing from the scope of the methods described herein. For example, stages may be omitted, added or rearranged.

The flashcard database 170 can be any type of computer database such as a SQL database so long as its contents are accessible by the user in some manner. The user can then use the electronic flashcard to test his or her knowledge about the key word or phrase identified previously.

The present electronic flashcard allows the user to create the electronic flashcard from existing content. Alternatively, the user can create the electronic flashcard independently of the content. The electronic flashcard can not only contain the content component and its translation but also the sentence that originally contained the content component and its translation to provide context to the user. In addition, the electronic flashcard can contain a link to audio that has been created and stored in association with the sentence that appears in the flashcard. The flashcard is stored with correspondence information that points to a phrase_id in a phrase table in a relational database, and the phrase_id is stored with correspondence information that points to the sentence in a sentence table. The sentence includes correspondence information that points to the audio.

Figure 12A:
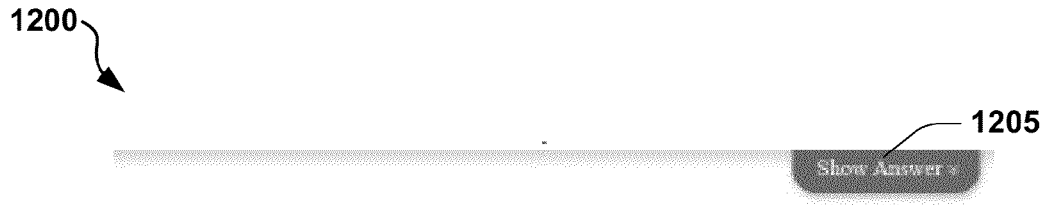
FIGS. 12A and 12B show two screenshots of an electronic flashcard created by the process of FIG. 11.
Figure 12B:
Figure 12B:
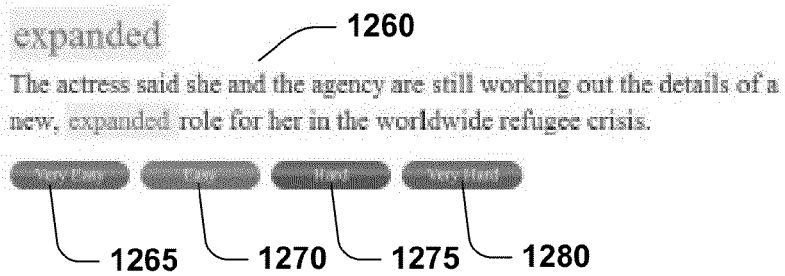

FIGS. 12A and 12B show two screenshots of an electronic flashcard created by the process 1100 of FIG. 11. FIG. 12A shows a screenshot 1200 showing a Spanish language portion 1210 of a sentence that the user identified at stage 1115 of the process 1100. A show answer button 1205 allows the user to display the second/source language version of the portion. FIG. 12B shows a screenshot 1250 that shows the expanded portion of the flashcard showing the translated sentence 1260. Typically the user will press the show answer button 1205 after they feel that they understand the sentence 1210, are not sure they understand it or are completely stumped by the sentence 1210.

The screenshot 1250 also shows input buttons 1265, 1270, 1275 and 1280 that the user uses to rate the ease or difficulty in understanding the sentence 1210 in the screenshot 1200. The level of difficulty buttons include a very easy button 1265, an easy button 1270, a hard button 1275 and a very hard button 1280.

Figure 13:
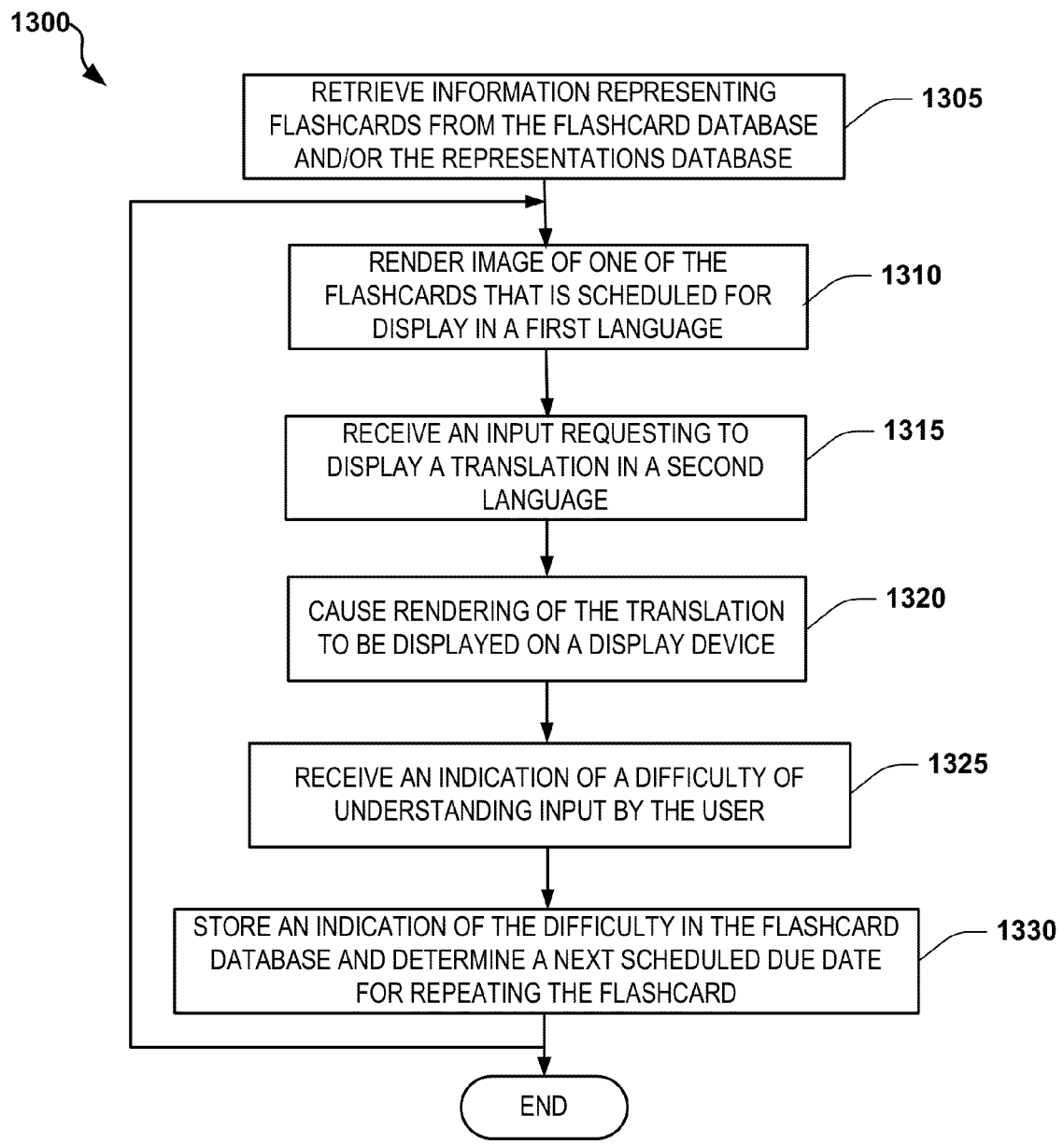
FIG. 13 is a flowchart illustrating an exemplary process for displaying flashcards created by the process of FIG. 11.

FIG. 13 is a flowchart illustrating an exemplary process 1300 for displaying flashcards created by the process of FIG. 11. The process 1300 can be performed on one of the mobile devices 120 using the client application 122 or by the non-mobile device 130 using the web browser 140. The process 1300 starts at stage 1305 where the client application 122 retrieves information representing flashcards that the user has previously created using the process 1100 of FIG. 11. The flashcard information can be retrieved from the flashcard database 170, the representations database 150 (using a correspondence hash) via the backend server 110 and/or from the memory 125 or database 135.

At stage 1310, the client application 122 causes a display to render an image of one of the flashcards that is scheduled for display. The rendering of the flashcard initially renders a portion of content in the first/target language (see FIG. 12A) that a user is learning without displaying the second/source language that the user reads fluently. At stage 1315, the client application 122 receives an indication of an input by the user, the input requesting display of a translation in the second/source language. At stage 1320, the client application causes rendering of the translation in the second/source language on the display. At stage 1325, the client application receives an indication of a difficulty of understanding input by the user. The electronic flashcard can be graded by the user, for example, on a scale of 1 to 4, based on its difficulty according to the user, 1 being very hard, 2 being hard, 3 being easy and 4 being very easy. Alternatively, the difficulty can be calculated based on the amount of time it takes for the user to identify that the electronic flashcard is answered.

The difficulty rating then allows repeat use of the electronic flashcard to be scaled either more frequently or less frequently based on the difficulty according to the user. At stage 1330, the client application stores an indication of the difficulty of understanding in the flashcard database 170 (or the memory 125 or the database 135). The client application uses the difficulty of understanding information to determine a due date to display the current flashcard again.

The electronic flashcard is assigned a due date interval, I(n), derived from the number of times a user has reviewed a given electronic flashcard and the difficulty the user had in understanding the flashcard as indicated by the difficulty measure provided by the user. By way of example, if the electronic flashcard has 0 or 1 repetitions, the due date is adjusted by 1 day. If there are 2 repetitions, the due date is adjusted by 6 days. If there are greater than 2 repetitions, an easiness factor (EF or E-Factor) can be calculated based on the following recursive equation, wherein the equation and associated default values are by way of example and not limiting the scope of the claimed method:

$$EF2 = EF1 + (0.1 - (5-q)*(0.08 + (5-q)*0.02))$$

EF—easiness factor with default value of 2.5, where EF1 is the previous value and EF2 is the new value.

q—rating difficulty ranging from 1 to 4 (or 0 to 5 in other embodiments) with 1 the being the most difficult and 4 being the easiest.

If EF2 is less than 3, the repetitions revert back to a due date of 1 day for the next repetition and a due date of 6 days for the following repetition. If EF2 is greater than 3, the next due date interval is determined by scaling the previous due date interval by EF2. Items that score 4 may be removed from the repetition schedule, in some embodiments.

The stages 1310 to 1330 of the process 1300 are repeated for each flashcard in the flashcard database 170 that is associated with the user and is due for display the day that the process 1100 is being executed. The process 1300 is exemplary only and modifications to the process can be made without departing from the scope of the methods described herein. For example, stages may be omitted, added or rearranged.

The electronic flashcard created by the process 1100 and displayed by the process 1300 can be used in a number of modes depending on how the user is studying the first/target language. A first mode provides for a contextual translation between the first/target language and the second/source language. The contextual translation includes a word or phrase within the context of the sentence, which allows the user to determine the context of the translated word to better understand what the word means in light of the entire sentence as described above. A second mode provides for a word or phrasal translation from the first/target language to the second/source language without translations of the rest of the sentence surrounding the word or phrase. The word or phrasal translation limits the translation to just the content component to make the user's experience more challenging. A third mode provides for an explanation of select words or phrases in the first/target language. Both the explanation and the word would be of the first/target language to allow the user to learn the word while in the context of the first/target language as a whole. The third mode allows for a deeper immersion into the first/target language that cannot be achieved by simple word-to-word language translations.

Figure 14:
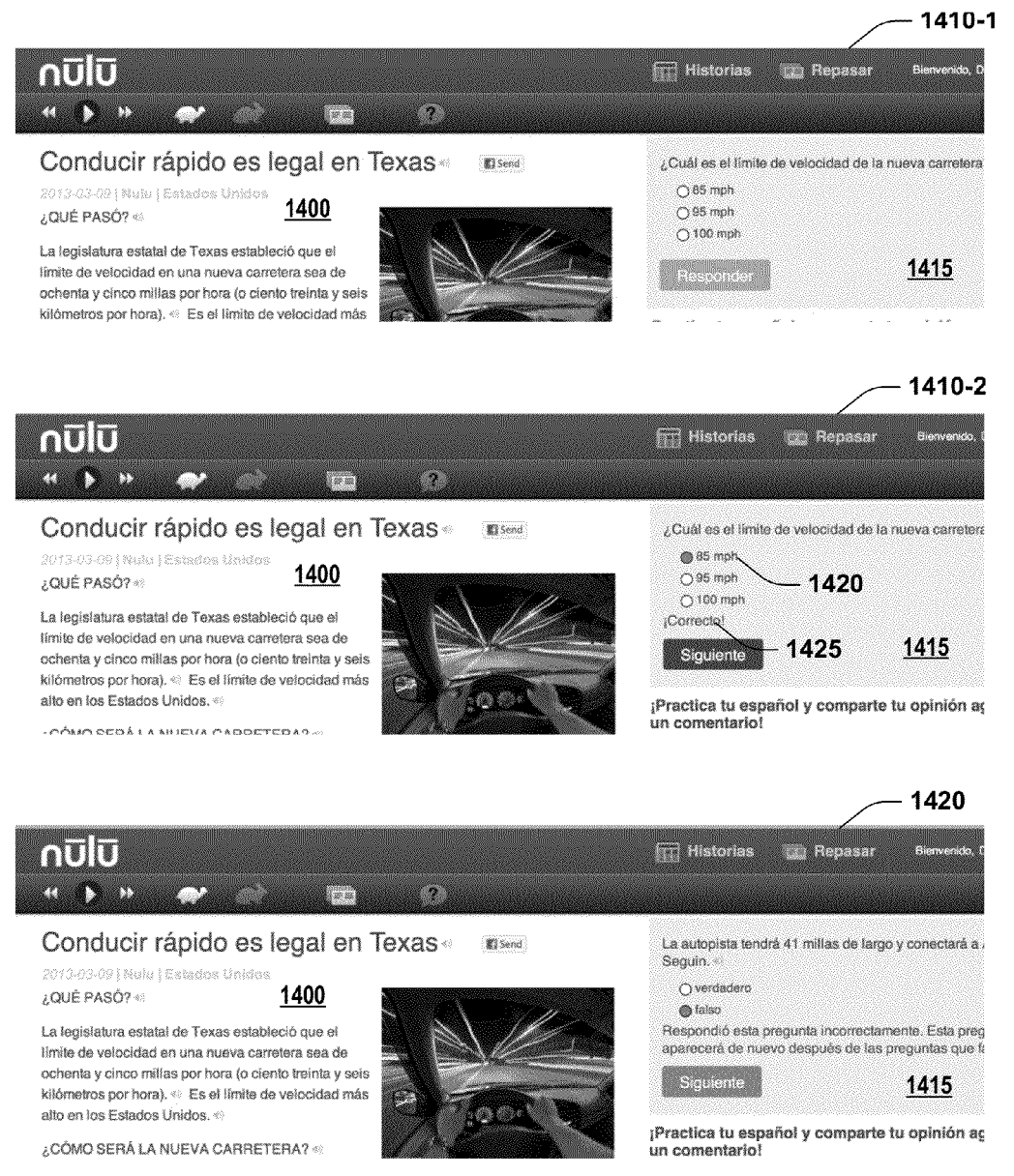

A further aspect of the language learning systems and methods described herein is presentation of tests of comprehension and understanding. FIG. 14 shows three screenshots presented to a user as part of a test of comprehension after the user has read and/or listened to content created by the process of FIG. 4. A screenshot 1410-1 includes a question area 1415 that presents a question regarding content contained in a dual language content 1400. A screenshot 1410-1 shows a user selected multiple choice answer 1420 which is correct and a notification 1425 reading "Correcto," or the associated phrase in the user's preferred interface locale, is displayed in the question area 1415. In this example, the question and the notification are both in the targeted language that the user is learning. A screenshot 1430 shows an incorrect answer 1435 and an explanation 1440 as to why the answer 1435 was incorrect. Again the question and the explanation 1440 are in the targeted language.

Figure 15:
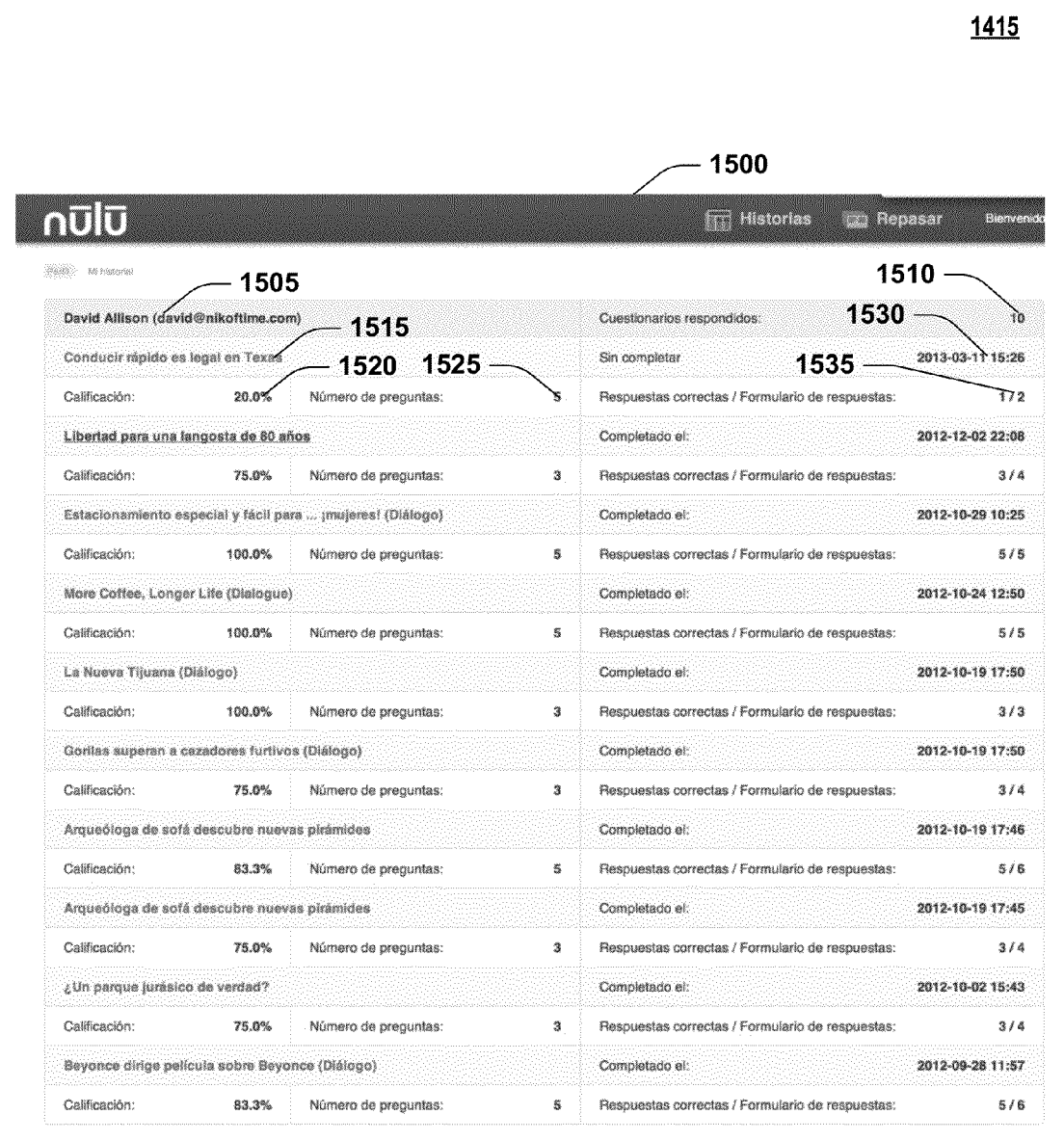

The language learning system and methods described herein can provide the user with a history of progress in the tests of comprehension that the user has completed. FIG. 15 shows a screenshot 1500 that shows a view of a history of results of tests of comprehension completed by a user. The screenshot 1500 shows a user ID 1505 and a number of tests 1510 that the user has completed (10 tests in this example). For each of the completed tests, the screenshot 1500 shows a title 1515 of the content that a test is associated with, a percentage of correct answers 1520, a number of questions 1525 in the test, a date of the test 1530 and a fraction 1535 showing the number of correct answers and the number of questions answered. In the first test shown in the screenshot 1500, the user answered only 2 out of 5 questions and got only 1 of the two answered questions correct, thereby resulting in a percentage 1520 of 20% and a fraction 1535 of ½, where the fraction 1535 is the number of correct responses divided by the total responses. The language learning system and methods described herein can suggest content to the user with a prescribed difficulty level, where the difficulty level is determined based on the performance history of the user.

Figure 16:
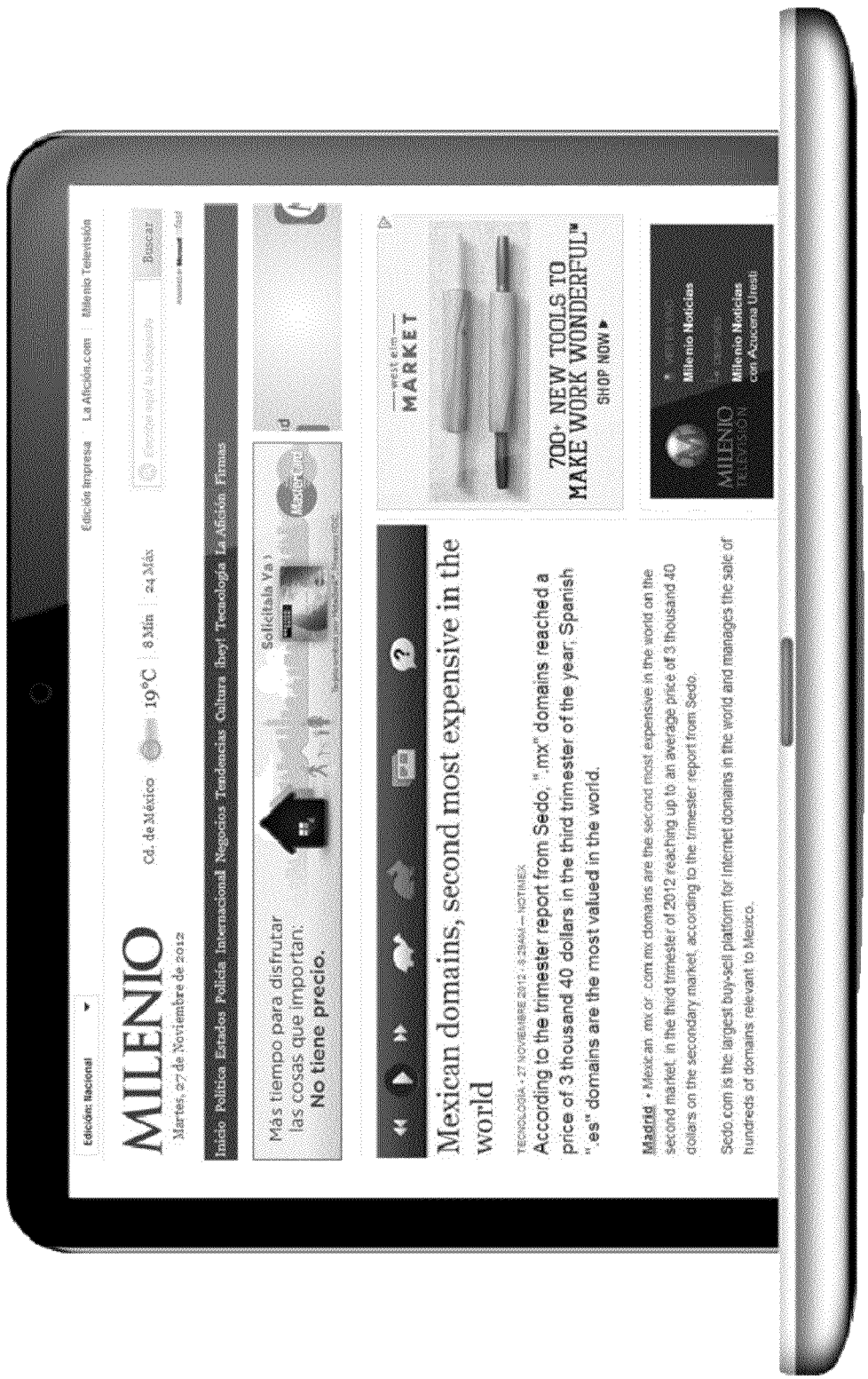
FIG. 16 shows an exemplary third party website which includes embedded code configured to allow a viewer of the website to utilize dual language content using the process of FIG. 10.

A further aspect of the language learning systems and methods described herein involves third party websites that utilize the dual language content created by the process of FIG. 4. FIG. 16 shows an exemplary third party website which includes embedded code configured to allow a viewer of the website to utilize dual language content using the process of FIG. 10. A third party publisher can provide the dual language content created using the process of FIG. 4 on its own website through means of embedded content retrieved from the backend server 110, for example, through an IFRAME. A publisher can communicate content to be transformed into dual language content to the backend server 110 through an application programming interface (API) or other means such as email communication. The content can be transformed at the backend server 110 into multiple language representations, audio, and other features described herein. A publisher may then embed code in its website that will enable a user of its website to view the publisher's content with all of the support features as described in reference to FIGS. 10 and 11 through means of embedded content. From a user's perspective, the publisher's content can be used for language learning through an embedded version of the systems and methods described herein on the publisher's website.

A further aspect of the language learning systems and methods described herein is a social network for connecting with others learning the same language, including use of a platform such as, for example, Facebook. A user may interact with friends and others learning the foreign language through the same content. This will allow the program to better recommend content for users to study, as well as act as a learning aid to keep the user engaged through producing content in the user's target language.

Finally, another aspect of the language learning systems and methods described herein is the incorporation of algorithms to suggest content for a user based on the user's preferences and skill levels, as determined by prior user usage of the program. These content suggestion algorithms can incorporate machine learning classification techniques to help classify content effectively across a wide set of users. For example, Support Vector Machines could be used to classify content as to how likely a user would be to interact with the content (to spend time reading and listening to a story, for example). An algorithm can be produced which uses histories of other users as training data. The algorithm can then analyze the current user's reading history as a dataset-to-be-classified. The algorithm can then determine how probable a user would be to spend time reading and listening to a particular novel story. Further, the program will be able to incorporate algorithms to suggest other language learners, either learners targeting the same language as a user, or native speakers of the user's target language, with whom the language learner may want to interact, based on attributes of the other language learners. These attributes include users' skill level, the types of content they read most often, and other attributes of their user profile within the system, including demographic attributes.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Many alterations and modifications may be made by those having ordinary skill in the art without departing from the spirit and scope of the language learning systems and methods described herein. Therefore, it must be understood that the illustrated embodiments have been set forth only for the purposes of example and that it should not be taken as limiting the following claims. For example, notwithstanding the fact that the elements of a claim are set forth below in a certain combination, it must be expressly understood that the invention includes other combinations of fewer, more or different elements, which are disclosed in above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular Method and System for Displaying Translated Text for Language Learning as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims (to be added upon conversion).

What is claimed is:

1. A method of presenting dual language content, the method comprising:
   retrieving digital content from a memory, the digital content comprising textual information in a first language;
   rendering, by a display of a device, an image of the digital content in the first language;
   receiving, from an input device coupled to the display, an indication that a specified portion of the textual information is to be displayed in a second language, the specified portion comprising at least one of a word within a phrase and the phrase;
   retrieving, from the memory, correspondence information stored in association with the specified portion, the correspondence information identifying at least a translated phrase in a second language corresponding to the specified portion;
   providing contact information regarding a recommended other language learner with whom a user of the device may interact to discuss the digital content; and
   rendering an image of the translated phrase on the display in proximity to the specified portion,
   wherein the correspondence information includes information mapping one or more of a plurality of words in the translated phrase to respective one or more words in the specified portion of the digital content.

2. A method comprising:
retrieving digital content from a memory, the digital content comprising textual information in a first language;
rendering, by a display device, an image of the digital content in the first language; receiving, from an input device, an indication that a specified portion of the textual information is to be included in a flashcard database;
retrieving, from the memory, correspondence information stored in association with the specified portion, the correspondence information indicating a translated phrase in a second language corresponding to the specified portion and stored in the memory in association with the correspondence information;
retrieving from the memory and based on the correspondence information, translation information representing the translated phrase in the second language; and
storing, in a flashcard database, first information representing the specified portion in the first language and the translation information;
wherein the correspondence information includes:
first correspondence information identifying a paragraph number and a sentence number in the paragraph to which the translated phrase corresponds, and
second correspondence information mapping one or more of a plurality of words in the translated phrase to respective one or more words in the specified portion of the digital content.

3. The method of claim 2 further including displaying, upon the display device and in accordance with a flashcard routine, portions of the first information and the translation information.

4. A method comprising:
rendering, on a display device, content in a first language;
receiving user input indicating that a specified portion of the content is to be displayed in a second language;
retrieving correspondence information stored in association with the specified portion;
retrieving, from a memory and based upon the correspondence information, a translated content portion in the second language;
rendering, on the display device, the translated content portion in proximity to the specified portion;
rendering, on the display device, at least one question regarding the content in the first language;
receiving a user input response to the at least one question; and
rendering, on the display device, additional content in the first language, wherein the additional content is of a difficulty level determined based on correctness of the user input response to the at least one question.

5. A method comprising:
hosting a website at a server, the website including content in a first language receiving, at the server hosting the website, content translation code from a remote server;
embedding the content translation code in the website;
receiving, at the server hosting the website and from a user device, a request to display a portion of translated content in a second language;
retrieving, using the embedded content translation code, translated content associated with the requested portion; and
sending the retrieved translated content to the user device for display.

6. A method comprising:
rendering, on a display device, content in a first language;
receiving user input indicating that a specified portion of the content is to be included within a flashcard database;
retrieving correspondence information stored in association with the specified portion;
retrieving, from a memory and based upon the correspondence information, a translated content portion in a second language; and
storing, in the flashcard database, flashcard information representative of the specified portion and the translated content portion.

7. A system for presenting dual language content, the system comprising:
memory; and
a processor coupled to the memory, the processor being configured to:
retrieve digital content from the memory, the digital content comprising textual information in a first language,
cause a display of a device to render an image of the digital content in the first language,
receive, from an input device coupled to the display, an indication that a specified portion of the textual information is to be displayed in a second language, the specified portion comprising at least one of a word within a phrase and the phrase,
retrieve, from the memory, correspondence information stored in association with the specified portion, the correspondence information identifying at least a translated phrase in a second language corresponding to the specified portion, and
cause the display to render an image of the translated phrase in proximity to the specified portion;
wherein the correspondence information includes information mapping one or more of a plurality of words in the translated phrase to respective one or more words in the specified portion of the digital content; and
wherein the correspondence information further includes information identifying, in numerical order of appearance within the digital content, a paragraph number and a sentence number in the paragraph to which the translated phrase corresponds.

8. A system comprising:
memory; and
a processor coupled to the memory, the processor being configured to:
retrieve digital content from the memory, the digital content comprising textual information in a first language,
cause a display device to render an image of the digital content in the first language,
receive, from an input device, an indication that a specified portion of the textual information is to be included in a flashcard database,
retrieve, from the memory, correspondence information stored in association with the specified portion, the correspondence information indicating a translated phrase in a second language corresponding to the specified portion and stored in the memory in association with the correspondence information,
retrieve from the memory and based on the correspondence information, translation information representing the translated phrase in the second language, and
store, in a flashcard database, first information representing the specified portion in the first language and the translation information;
wherein the correspondence information includes:
first correspondence information identifying a paragraph number and a sentence number in the paragraph to which the translated phrase corresponds, and second correspondence information mapping one or more of a plurality of words in the translated phrase to respective one or more words in the specified portion of the digital content.

9. A system comprising:
memory; and
a processor coupled to the memory, the processor being configured to:
  cause a display device to render content in a first language,
  receive user input indicating that a specified portion of the content is to be included within a flashcard database,
  retrieve correspondence information stored in association with the specified portion,
  retrieve, from the memory and based upon the correspondence information, a translated content portion in a second language, and
  store, in the flashcard database, flashcard information representative of the specified portion and the translated content portion.

10. A non-transient computer readable medium storing program code which, when executed by a processor, causes the processor to:
  cause a display device to render content in a first language,
  receive user input indicating that a specified portion of the content is to be included within a flashcard database,
  retrieve correspondence information stored in association with the specified portion,
  retrieve, from the memory and based upon the correspondence information, a translated content portion in a second language, and
  store, in the flashcard database, flashcard information representative of the specified portion and the translated content portion.

11. A method comprising:
hosting a website at a server, the website including content in a first language receiving, at the server hosting the website, content translation code from a remote server; embedding the content translation code in the website;
receiving, at the server hosting the website and from a user device, a request to display a portion of translated content in a second language;
causing the user device to display a user interface element enabling the translated content portion to be requested with the user device;
retrieving, using the embedded content translation code, translated content associated with the requested portion; and
sending the retrieved translated content to the user device for display.

* * * * *